United States Patent [19]

Jolma et al.

[11] Patent Number: 5,652,748
[45] Date of Patent: Jul. 29, 1997

[54] METHOD FOR MAKING A HANDOVER IN A CDMA CELLULAR RADIO SYSTEM, AND A MOBILE STATION

[75] Inventors: Petri Jolma; Risto Uola, both of Oulu, Finland

[73] Assignee: Nokia Telecommunications Oy, Espoo, Finland

[21] Appl. No.: 436,452

[22] PCT Filed: Sep. 19, 1994

[86] PCT No.: PCT/FI94/00415

§ 371 Date: May 22, 1995

§ 102(e) Date: May 22, 1995

[87] PCT Pub. No.: WO95/08901

PCT Pub. Date: Mar. 30, 1995

[30] Foreign Application Priority Data

Sep. 20, 1993 [FI] Finland .................................. 934113

[51] Int. Cl.⁶ .................................................. H04L 27/30
[52] U.S. Cl. .......................... 370/320; 455/38.1; 455/436; 370/326; 370/335; 370/342
[58] Field of Search ...................... 370/18, 95.3; 375/205; 455/33.1, 33.2, 38.1, 38.3, 54.1; 340/825.04, 825.44; 379/58, 59, 60

[56] References Cited

U.S. PATENT DOCUMENTS

| | | | |
|---|---|---|---|
| 5,164,958 | 11/1992 | Omura | 375/205 |
| 5,179,571 | 1/1993 | Schilling | 370/18 |
| 5,195,090 | 3/1993 | Bolliger et al. | 455/33.1 |
| 5,305,349 | 4/1994 | Dent | 375/205 |
| 5,345,467 | 9/1994 | Lomp et al. | 375/205 |
| 5,448,600 | 9/1995 | Lucas | 375/205 |
| 5,513,246 | 4/1996 | Jonsson et al. | 379/60 |

FOREIGN PATENT DOCUMENTS 91 7036   5/1991   WIPO .

OTHER PUBLICATIONS

Cooper et al., *Modern Communication and Spread Spectrum*, "Detection of Spread-Spectrum Signals", 1986, Chapter 12, pp. 345–375.

Baier, et al: "Design Study for a CDMA-Based Third-Generation Mobile Radio System", IEEE Journal on Selected Areas in Communications, vol. 12, No. 4, May 1994.

*Primary Examiner*—Benedict V. Safourek
*Assistant Examiner*—Ricky Q. Ngo
*Attorney, Agent, or Firm*—Cushman Darby & Cushman IP Group of Pillsbury Madison & Sutro LLP

[57] ABSTRACT

A mobile station, and a method for making a handover in a CDMA cellular radio system, which includes in each cell at least one base station connected to the mobile stations in the cell. The connection includes both a traffic channel and one or more control channels. The transmissions of the base stations are not synchronized with each other. A mobile station, after having established a simultaneous connection with two or more of the base stations while making a handover, transmits to the base stations using the same spreading code. The signals received by the base stations are combined in a base station controller, or the like. The base stations with which the mobile station communicates simultaneously, transmit to the mobile station each using a different spreading code. The mobile station receives and demodulates each of the signals, transmitted with different spreading codes, by a different rake receiving unit independent of the other units, each receiving unit being synchronized with the signal from the base station it is receiving. The mobile station combines the signals it has received from the base stations and demodulated by using its plural rake receiving units.

7 Claims, 3 Drawing Sheets

METHOD FOR MAKING A HANDOVER IN A CDMA CELLULAR RADIO SYSTEM, AND A MOBILE STATION

BACKGROUND OF THE INVENTION

The invention relates to a method for making a handover in a CDMA cellular radio system, which comprises in each cell at least one base station connected to the mobile stations in the cell, this connection comprising both a traffic channel and one or more control channels, and in which the transmissions of the base stations are not synchronized with each other, in which method a mobile station, after having established a simultaneous connection with two or more base stations while making a handover, transmits to the base stations using the same spreading code, and in which the signals received by the base stations are combined in a base station controller or the like.

CDMA is a multiple access method, which is based on the spread spectrum technique, and which has been applied only recently in cellular radio systems, in addition to the prior FDMA and TDMA methods. CDMA has several advantages over the prior methods, for example spectral efficiency and the simplicity of frequency planning.

In CDMA, each signal consists of an individual pseudo-random sequence which modulates the base frequency, simultaneously spreading the band of the data signal. The data signals of several system users are transmitted simultaneously on the same frequency band. The users are distinguished from one another on the basis of the pseudorandom sequence, called the spreading code. Correlators provided in the receivers are synchronized with a desired signal, which they recognize on the basis of the spreading code, and they restore the band of the signal to its original band width. Signals arriving at the receiver and containing the wrong spreading code do not correlate in an ideal case, but retain their wide band and appear thus as noise in the receivers. The spreading codes used by the system are preferably selected in such a way that they are mutually orthogonal, i.e. they do not correlate with each other.

In a typical cellular radio environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays.

The receiver generally utilized in a CDMA system is a so-called rake receiver, which consists of one or more rake branches, i.e. correlators. The rake branches are independent receiving units, the function of each unit being to combine and demodulate one multipath-propagated received signal component. The realization of a rake branch is described in greater detail in *Modern Communications And Spread Spectrum* (by G. Cooper and C. McGillem, McGraw-Hill, New York, 1986, Chapter 12). In addition to the rake branches intended for receiving signals, a CDMA receiver typically comprises at least one separate searcher branch, the function of which is to search for the different signal components of the signal transmitted with the desired spreading code and to detect their phases. Each rake branch can be made to correlate with a signal component which has propagated along an individual path, and each signal component arrives at the receiver with a different delay. The rake branches are controlled by giving the correlator information about the desired spreading code and its phase. Since the signal components propagate along separate paths, they also attenuate often independently. In a conventional CDMA receiver the signals of several correlators are preferably combined, whereupon a signal of good quality is achieved despite the multipath propagation along the radio path.

SUMMARY OF THE INVENTION

The present invention relates to making a handover in a CDMA radio network. In particular it relates to a so-called soft handover, which refers to the switching of a mobile station from one base station to another so that during the transition the mobile station communicates simultaneously with both base stations. Soft handover is used in CDMA radio networks, because the power control of a CDMA network would be unstable if the handover were made in the same way as in other systems (e.g. GSM and NMT systems), where the connection to the previous base station is cut off before a new connection is established with the new base station (hard handover).

In known CDMA radio systems, soft handover is realized so that two (or more) base stations transmit exactly the same signal to the mobile station in question. The signal comprises a traffic channel and the same signalling, and it is multiplied by the same spreading code in each base station. These signals which have propagated along different paths are received at the mobile station by means of the different branches of the rake receiver and combined in a diversity combiner. The rake receiver can combine easily only signals which have arrived with a delay differential of about 20 microseconds. Therefore the base stations have to have an accurate common reference clock, i.e. they have to be accurately synchronized with each other, so that they can time their transmissions in such a way that the signals arrive at the receiver of the mobile station with a sufficiently small time difference.

The synchronization of base stations with each other increases costs in the building of the system. The base stations have to have some accurate reference signal on the basis of which they can remain synchronized. A signal received, for example, from terrestrial or satellite radio navigation systems can function as such a reference signal. In addition to the reference signal, the costs are also increased by the fact that the compensation of quite an indeterminate transmission delay, usually lasting several milliseconds, causes a need for buffering at the base station.

The object of the present invention is to make it possible to use soft handover without the synchronization of base stations. Thus, a CDMA cellular radio network can be realized with lower costs than before.

This is achieved by means of a method described in the introduction, which is characterized in that the base stations with which the mobile station communicates simultaneously, transmit to the mobile station each using a different spreading code, and wherein the mobile station receives, demodulates and combines each of the signals, transmitted with different spreading codes, by a different rake receiving unit independent of the other units, each receiving unit being synchronized with the signal from the base station it is receiving, and wherein the mobile station combines the signals it has received from the base stations and combined by means of the different rake receiving units.

The invention relates further to a mobile station for use in a CDMA cellular radio system, which comprises in each cell at least one base station connected to the mobile stations in the cell, and in which the transmissions of the base stations are not synchronized with each other, the receiver in each such mobile station being realized by means of rake technique, one rake receiving unit comprising a control unit and a number of correlators, the input of which is the received signal, and means for combining the signals received by different branches, each such mobile station comprising means for adjusting the transmit power. The mobile station according to the invention is characterized in that the mobile station comprises at least two independent rake receiving units each of which can be synchronized with signals supplied from a different base station and which can receive, demodulate and combine the supplied signals, and means for combining the signals supplied from the output of the receiving units.

In a handover made according to the invention, the base stations communicating with the mobile station transmit to the mobile station the same traffic channel information multiplied by a spreading code which is different for every base station. According to the invention, the mobile station comprises several, independent rake receiving units, each of them containing possibly several correlator branches. The rake receiving units are synchronized independently with the signals from different base stations. Thus the delay differential between the signals supplied from different base stations decreases to about 5 milliseconds. This is easily achieved even though the base stations are not synchronized with each other.

BRIEF DESCRIPTION OF THE DRAWINGS

In the following the invention will be described in greater detail with reference to the examples according to the accompanying drawings, in which.

DETAILED DESCRIPTION

Figure 1:
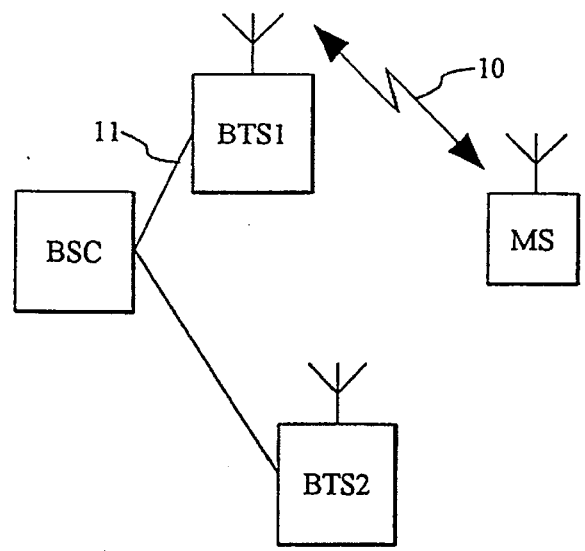
FIG. 1 is a diagram showing one part of a cellular network where the method according to the invention can be applied.

FIG. 1 is a schematic representation of one part of a CDMA cellular radio system. Two base stations BTS1 and BTS2 are connected to the base station controller BSC by means of digital transmission links 1. The coverage area of one base station BTS forms typically one radio cell. The base stations are not synchronized with each other. The base station controller is in communication with other parts of the cellular network and with the fixed network.

Figure 2:
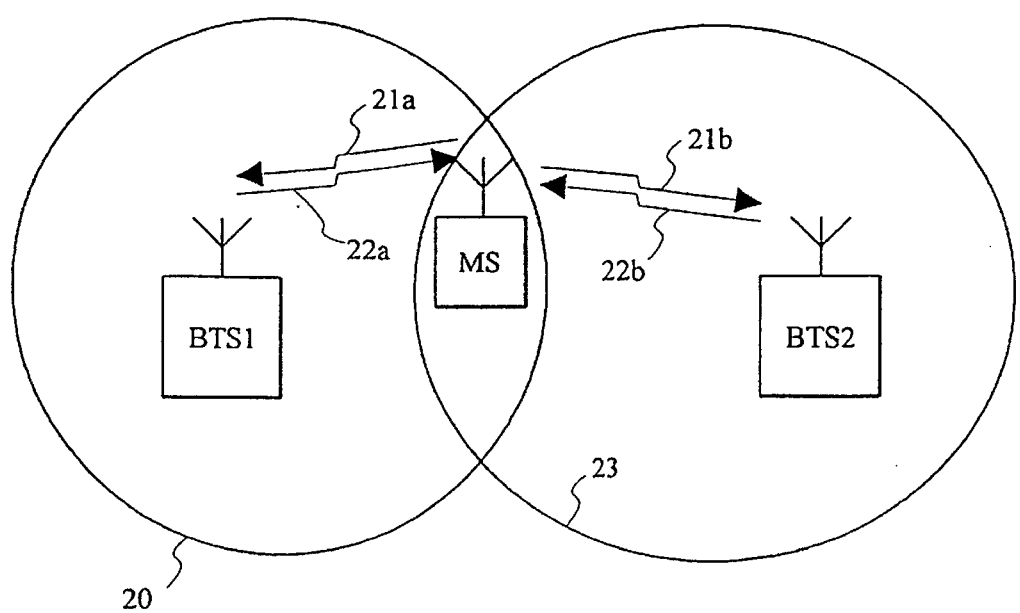
FIG. 2 illustrates a situation where a mobile station is making a handover between two cells.

In the situation of FIG. 2, the mobile station MS has established a connection with two base stations BTS1 and BTS2 serving different cells, for the purpose of a handover. In the following, the invention will be described by way of example in the case of two base stations as shown in FIG. 2 without, however, being limited to it.

The mobile station transmits its own signal 21a and 21b by using the spreading code it has been allocated. The base stations with which the mobile station communicates receive and demodulate the same signal independently of each other. The base stations forward the signal they have received to the base station controller BSC, which selects the signal which has been received better for further transmission. This selection of a better signal can be realized by known methods, for example frame by frame: from the frames transmitted by the base stations, the base station controller always selects the one received with the best quality. For example signal power or bit error rate can be used as a standard for the quality.

The base stations receive the payload information to be sent to the mobile station from the base station controller. Both base stations use their own spreading code and transmit their signals 22a and 22b independently of each other to the mobile station. In the example, the receiver of the mobile station comprises two mutually independent rake receiving units. The structure of the mobile station will be described in greater detail later on. The mobile station receives each of the signals transmitted by the base stations by separate rake receiving units, which function independently of each other. Each rake receiving unit is synchronized with the signal it is receiving, and therefore the units can be asynchronous with each other. The signals received by the rake receiving units are combined, preferably before the loudspeaker. The combining may be performed by known methods. At each instant, for example a signal with better quality can be selected. The quality of the signals can be monitored by means of, for example, signal power or bit error rate. The combined signal is D/A-converted and supplied to the loudspeaker.

In the method according to the invention, the mobile station has thus two separate, independent links to the network through different base stations. The control of both connections, for example the power control signalling, is performed independently of each other, i.e. even though the payload information, for example the speech signal, in the traffic channel is the same for both connections, the information in the control channels differs between the connections. Since the signal transmitted over the connections is thus different, different spreading codes have to be used for different connections from the base stations to the mobile station. If the spreading codes were the same, the connections would interfere with each other.

Naturally, the connections have to have a higher level control, which establishes one link, if necessary, and disconnects another when it is no longer needed. This kind of control is performed in the same way as when a soft handover is made by means of a known method in a synchronized CDMA cellular radio system.

Figure 3:
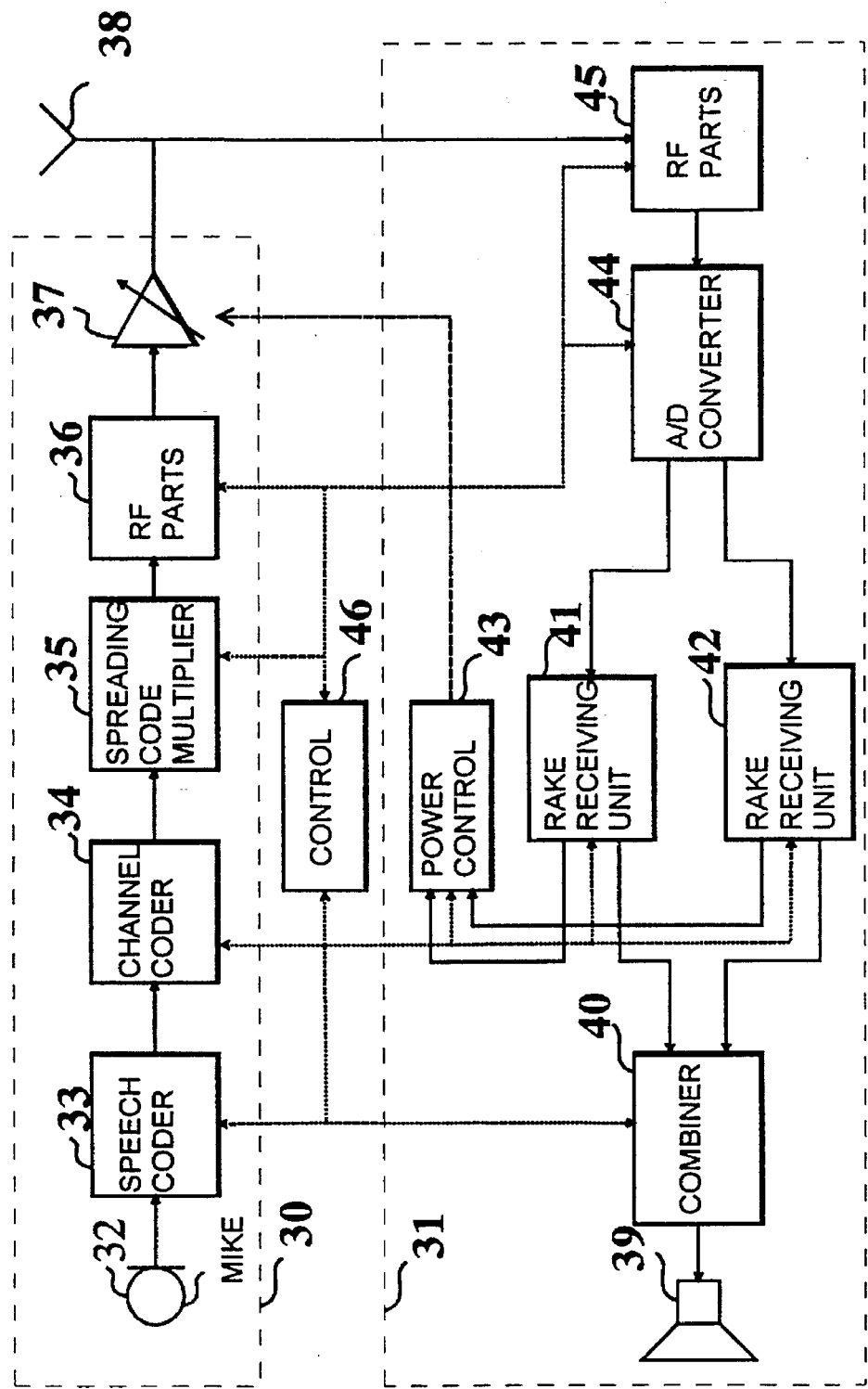
FIG. 3 represents the structure of a mobile station according to the invention.

FIG. 3 shows a simplified structure of a mobile station according to the invention. In the transmitter 30 of the mobile station, a signal is supplied from the microphone 32 through the speech coder 33 to the channel coder 34, after which the signal is multiplied by the spreading code 35. After this, the signal is supplied through the RF parts 36 and the amplifier 37 to the antenna 38.

In the receiver 31 of the mobile station, the signal received by the antenna 38 is supplied, after the RF parts 45, to the A/D converter 44. From there, the signal is supplied to the rake receiving units 41 and 42, which multiply the received signal independently by their individual spreading codes and demodulate the signal.

Figure 4:
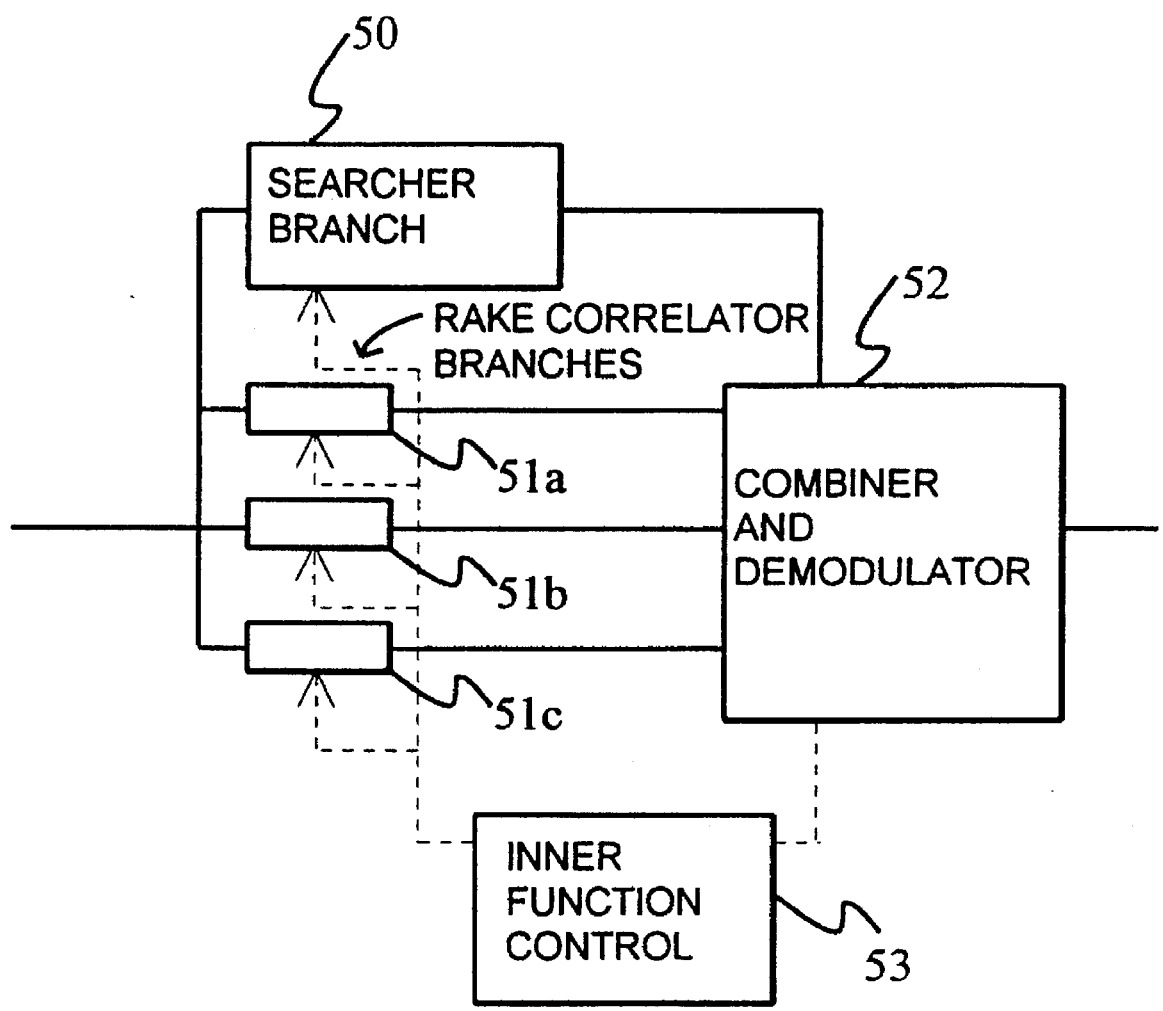
FIG. 4 represents the structure of a rake receiving unit.

FIG. 4 illustrates the structure of a rake receiving unit. Each rake receiving unit can comprise several rake correlator branches 51a to 51c and a searcher branch 50. In addition, the unit comprises means 52 for combining and demodulating advantageously the signals of different branches, and means 53 for controlling the inner functions of the receiving unit.

The mobile station also comprises means 40 to which the signals from the rake receiving units are supplied and in which the signals are preferably combined. This can be achieved, for example by selecting a better frame at each instant, or by means of some other known method. The combined signal is supplied to the loudspeaker 39.

The rake receiving units also output power control signals, which are supplied to the power control means 43.

Each base station with which the mobile station communicates transmits its own power control commands to the mobile station over its own connection. The power control means select from the given power control commands the one which is suitable in each situation and control the amplifier 37 of the transmitter 30. From the given commands it is possible to select, for example, the one with the lowest transmit power for the mobile station, to keep the power control of the entire cellular network stable.

The mobile station also comprises means 46 for controlling the aforementioned units.

Even though the invention is described above with reference to the example according to the accompanying drawings, it is clear that the invention is not limited to it, but it can be modified in many ways within the scope of the inventive idea set forth in the appended claims.

We claim:

1. A method for making a handover of a mobile station, in a CDMA cellular radio system which has a plurality of cells, in each of which at least one base station is arranged to be connected to a plurality of mobile stations located in the respective cells by respective connections, each including both a traffic channel and at least one control channel, one of said mobile stations being said mobile station which is to be handed over, and in which system, signal transmissions of said base stations in different ones of said cells to said mobile station are not synchronized with one another, said method comprising:

(a) said mobile station establishing a simultaneous connection with at least two of said base stations having signal transmissions which are not synchronized with one another, as a step in participating in a handover from one to another of said at least two base stations;

(b) said mobile station, subsequent to establishing said simultaneous connection, transmitting signals to both of said one and other of said base stations using a same spreading code;

(c) said one and other base stations receiving said signals transmitted in step (b) and providing these received signals to a base station controller;

(d) combining said received signals in said base station controller for forwarding of payload contained therein;

(e) said one and other base stations transmitting signals to said mobile station using respective spreading codes which are different from one another;

(f) said mobile station receiving, demodulating, and combining signals transmitted by each and both said one and other base stations in step (e), using respective rake receiving units which are synchronized with respective of said one and other base stations.

2. The method of claim 1, wherein:

in step (e), the signals transmitted by said one and other base stations to said mobile station are transmitted at least in part on respective traffic channels, and said signals as transmitted by said one and other base stations in step (e) using said respective traffic channels contain substantially the same payload as one another for respective said connections.

3. The method of claim 1, wherein:

in step (e), the signals transmitted by said one and other base stations to said mobile station are transmitted at least in part on respective traffic channels, at least one for each of said one and other base stations, and said signals as transmitted by said one and other base stations in step (e) using said respective control channels, are substantially different from one another for respective said connections.

4. The method of claim 1, wherein:

in step (e), the signals transmitted by said one and other base stations to said mobile station are out of synchronization with one another by no more than 5 milliseconds.

5. A mobile station for use in a CDMA cellular radio system which has a plurality of cells, in each of which at least one base station is arranged to be connected to a plurality of mobile stations located in the respective cells, by respective connections, and in which signal transmissions of said base stations in different ones of said cells are not synchronized with one another, said mobile station comprising:

an adjustable-power transmitter, for transmitting signals to be received by said base stations via said respective connections;

a receiver comprising a plurality of rake receiving units each including a control unit and a plurality of correlators on respective branches, collectively for receiving signal transmissions from a respective of said one and other base stations, and demodulating and combining such signal transmissions, and providing a respective resulting output a combiner for combining into one resulting output demodulated and combined resulting outputs of reception of signal transmissions from the one and other base stations.

6. The mobile station of claim 5, further comprising:

a power control unit arranged to be controlled by control commands received by said receiving units via said signal transmissions, for adjusting transmitting power of said adjustable-power transmitter.

7. The mobile station of claim 6, wherein:

said power control unit arranged to be controlled by such of said control commands as will result in said adjustable-power transmitter transmitting at a lowest transmitting power relative to that which would result from being controlled by others of said control commands.

* * * * *